(12) United States Patent
Nobert et al.

(10) Patent No.: US 6,524,029 B2
(45) Date of Patent: Feb. 25, 2003

(54) GEOMEMBRANE AND METHOD OF MANUFACTURE

(75) Inventors: James E. Nobert, Arlington, TX (US); Jesse W. Raia, Dallas, TX (US)

(73) Assignee: Olympic General Corporation, Reno, NV (US)

( * ) Notice: Subject to any disclaimer, the term of this patent is extended or adjusted under 35 U.S.C. 154(b) by 0 days.

(21) Appl. No.: 09/859,064

(22) Filed: May 16, 2001

(65) Prior Publication Data

US 2002/0172814 A1 Nov. 21, 2002

(51) Int. Cl.[7] ................................................ B29C 44/24
(52) U.S. Cl. ............... 405/129.75; 405/303; 405/302.7; 264/173.12; 264/173.14; 264/173.19
(58) Field of Search ............................. 405/303, 302.4, 405/302.7, 129.75; 264/173.12, 173.14, 173.19

(56) References Cited

U.S. PATENT DOCUMENTS

| | | | | |
|---|---|---|---|---|
| 4,629,650 A | * | 12/1986 | Kataoka | 156/247 |
| 4,784,885 A | * | 11/1988 | Carespodi | 229/123.2 |
| 5,080,961 A | * | 1/1992 | Macy et al. | 264/173.13 |
| 5,183,706 A | * | 2/1993 | Bekele | 156/244.11 |
| 5,221,570 A | * | 6/1993 | Gokcen et al. | 156/244.11 |
| 5,248,470 A | * | 9/1993 | Dollinger et al. | 264/173.14 |
| 5,354,402 A | * | 10/1994 | Luetkens et al. | 156/244.11 |
| 5,403,126 A | * | 4/1995 | Carriker et al. | 405/129.75 |
| 5,508,330 A | * | 4/1996 | Coughlin et al. | 524/251 |
| RE35,272 E | * | 6/1996 | Mathieson et al. | 428/131 |
| 5,700,564 A | * | 12/1997 | Freedman | 428/332 |
| 5,736,237 A | * | 4/1998 | Rhee et al. | 324/326 |
| 5,763,047 A | * | 6/1998 | Green | 405/129.75 |
| 5,804,112 A | * | 9/1998 | Greene | 264/173.12 |
| 6,194,049 B1 | * | 2/2001 | Bindschedler-Galli et al. | 156/244.19 |
| 6,403,231 B1 | * | 6/2002 | Mueller et al. | 428/338 |

OTHER PUBLICATIONS

The Geosynthetic Research Institute: "GRI Test Method GM13", 13 pages, Dec. 13, 2000.*
The Geosynthetic Research Institute: "GRI Test Method GM17", 14 pages, Dec. 13, 2000.*

* cited by examiner

Primary Examiner—J. J. Swann
Assistant Examiner—Katherine Mitchell
(74) Attorney, Agent, or Firm—Michael A. O'Neil

(57) ABSTRACT

A geomembrane comprising a unitary structure fabricated by co-extrusion including a center core, a thermoplastic adhesive layer secured on one side of the center core, and a textured layer secured on the opposite side of the center core. The geomembrane is utilized in the manufacture of a liner for earthen constructions by employing the thermoplastic layer of the geomembrane to secure the geomembrane to a geosynthetic clay liner.

5 Claims, 3 Drawing Sheets

GEOMEMBRANE AND METHOD OF MANUFACTURE

TECHNICAL FIELD

This invention relates generally to geomembranes of the type utilized in the fabrication of liners for earthen constructions such as landfills, canals, ponds, etc., and more particularly to an improved geomembrane comprising a unitary structure fabricated by co-extrusion.

BACKGROUND AND SUMMARY OF THE INVENTION

Ground water contamination is a primary environmental concern. One method of controlling ground water contamination comprises the lining of landfills, canals, ponds, and similar earthen constructions with a liner comprising a geosynthetic clay liner and an underlying geomembrane. In this manner seepage from the lined construction into the underlying ground water is prevented.

More particularly, liners for landfills, canals, ponds, and similar earthen constructions may comprise a layer of bentonite. The upper surface of the bentonite layer is secured by a layer of woven polypropylene. A layer of non-woven polypropylene textile is positioned below the bentonite layer. A geomembrane is secured to the lower surface of the non-woven polypropylene textile which may be provided with a textured lower surface to prevent shifting of the liner relative to the underlying construction.

Heretofore the fabrication of liners in which a geomembrane is secured beneath a geosynthetic clay liner has been complicated by the necessity of applying a glue layer to the upper surface of the geomembrane in order to secure the geomembrane to the geosynthetic clay liner. The application of the glue layer has required a separate manufacturing step which has typically been carried out at a remote location. The cost of manufacturing the liner is therefore substantially increased.

The present invention comprises an improved geomembrane and method of manufacture which overcomes the foregoing and other difficulties which have long since characterized the prior art. More particularly, the present invention comprises an improved geomembrane construction which is directly bondable to a geosynthetic clay liner to complete the construction of a liner for landfills, canals, ponds, and similar constructions. In accordance with the preferred embodiment of the invention, the geomembrane comprises a unitary structure including an adhesive layer and a barrier layer which are fabricated by co-extrusion. The geomembrane of the present invention may further include a third co-extruded layer which may be textured.

By means of the present invention, the fabrication of liners for earthen constructions such as landfills, canals, ponds, and the like is greatly simplified. The improved geomembrane of the present invention is directly bondable to a geosynthetic clay liner to complete the construction of the liner, thereby eliminating the necessity of a separate adhesive application step. The use of the invention also results in an improved liner construction wherein the possibility of separation of the geomembrane from the remaining components of the liner is substantially eliminated.

BRIEF DESCRIPTION OF THE DRAWINGS

A more complete understanding of the invention may be gained by reference to the following Detailed Description when presented in conjunction with the accompanying Drawings, wherein.

DETAILED DESCRIPTION

Figure 1:
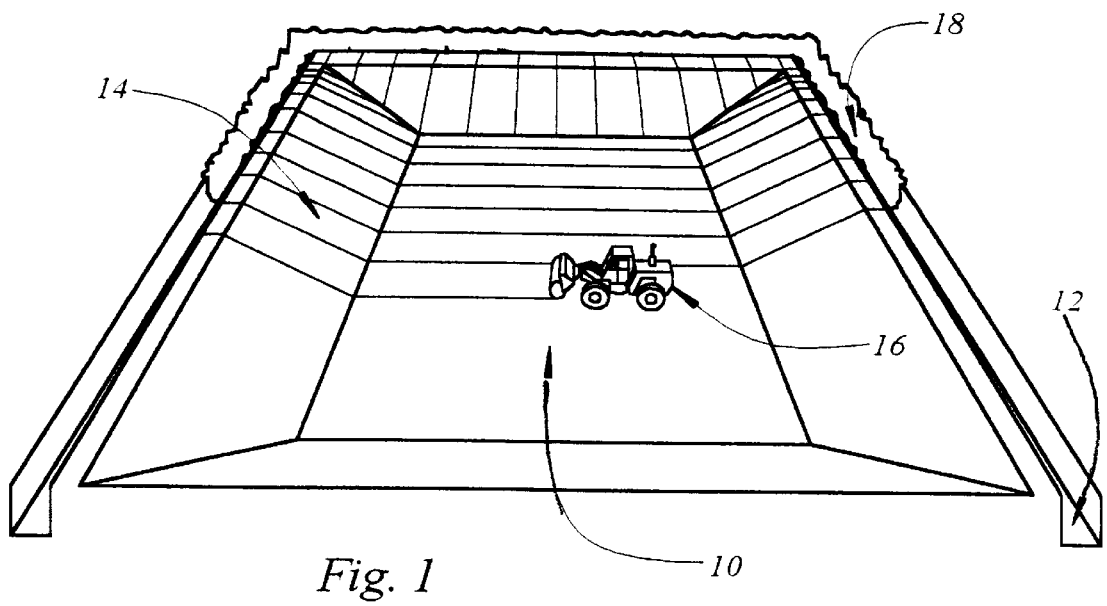
FIG. 1 is a diagrammatic illustration of the installation of a liner in a landfill, canal, pond, or similar earthen construction.

Referring now to the Drawings, and particularly to FIG. 1 thereof, the use of a liner incorporating the geomembrane of the present invention is diagrammatically illustrated. An excavation 10 is formed in the earth. The excavation 10 may ultimately comprise a landfill, a canal, a pond, or similar earthen construction. A trench 12 is formed along the sides of the excavation 10, it being understood that the configuration of the trench 12 depends upon the configuration of the excavation 10. A liner 14 incorporating the geomembrane of the present invention is provided in rolls. The liner 14 is unrolled in overlapping strips utilizing an appropriate vehicle 16. Each end of each strip comprising the liner 14 extends into the trench 12. Following installation of the liner 14, backfill 18 is installed in trench 12 to secure the liner in place.

Figure 2:
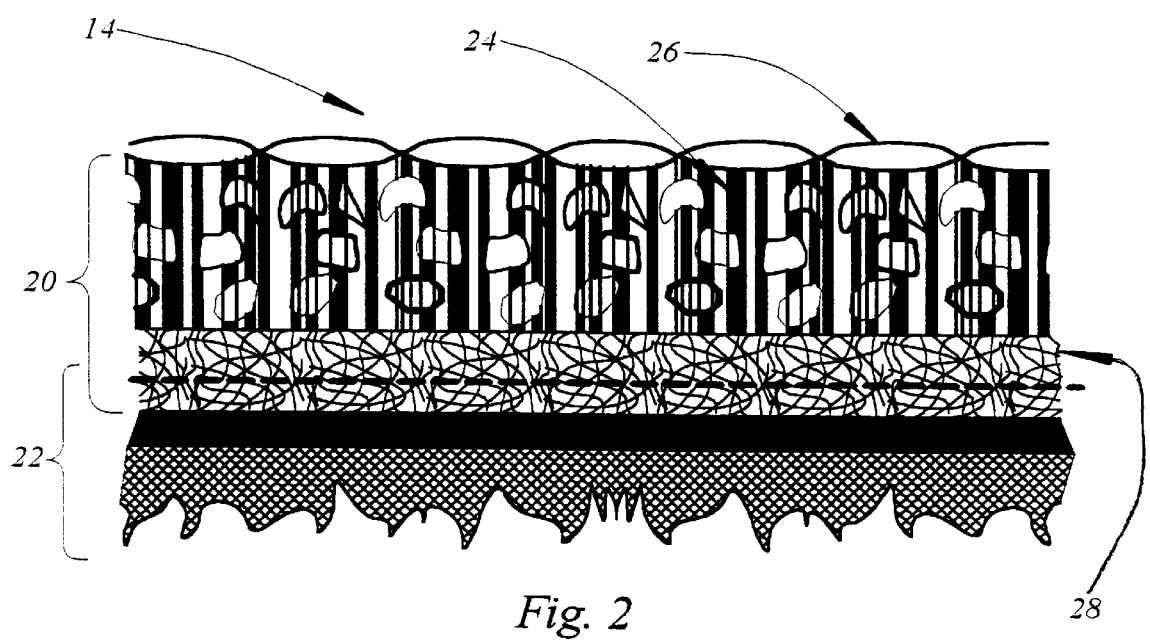
FIG. 2 is a sectional view illustrating a liner for landfills, canals, ponds, and similar construction incorporating the geomembrane of the present invention.

Referring to FIG. 2, liner 14 includes a geosynthetic clay liner 20 and a geomembrane 22 comprising the present invention. The geosynthetic clay liner 20 comprises a clay layer 24 which may comprise bentonite. The clay layer 24 is retained by a layer of woven polypropylene fabric 26 extending across the upper surface thereof. A layer of non-woven polypropylene material 28 extends across the lower surface of the clay layer 24.

Figure 3:
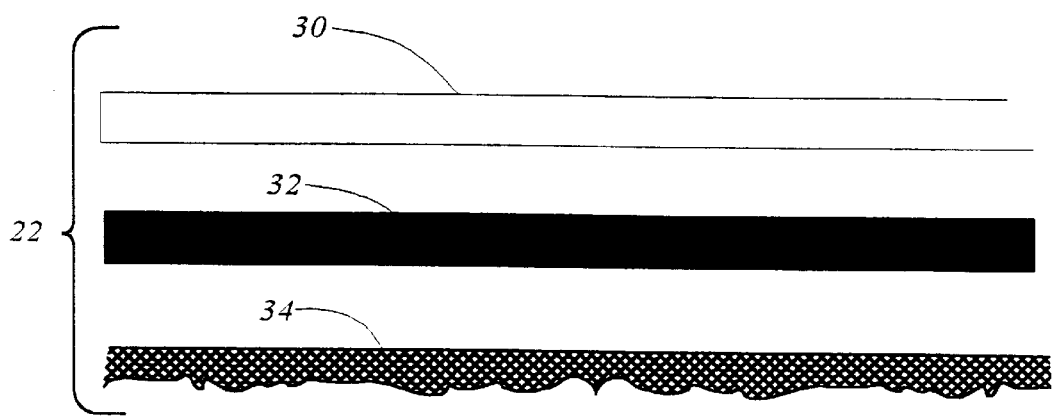
FIG. 3 is an exploded view of the liner of FIG. 2 further illustrating the invention.

The geomembrane 22 of the liner 14 is further illustrated in FIG. 3. The geomembrane 22 comprises a two layer construction, including a thermoplastic adhesive layer 30 and a barrier layer 32. The geomembrane 22 may also include a third layer 34, which may be textured as shown. In accordance with the invention, the geomembrane 22 comprises a unitary structure fabricated by co-extrusion.

The adhesive layer 30 of the geomembrane 22 may be formed from any of the following materials:
Ethylene Vinyl Acetate(EVA)
Ionomer
Ethylene Methyl Acrylate (EMA)
Ethylene Acrylic Acid (EAA)
Ethylene Methyl Acrylic Acid (EMAA)
Ethylene Ethyl Acrylate (EEA)
Polyethylene with density below 0.915 gm/cc
Polyolefins, copolymers and terpolymers of polyolefins with melt points below the melt point of the barrier layer 32.

The barrier layer 32 and the third layer 34, if used, may be formed from any of the following materials:
High Density Polyethylene
Linear Low Density Polyethylene
Low Density Polyethylene
Ultra Low Density Polyethylene
Very Low Density Polyethylene
Polypropylene Polypropylene copolymers and terpolymers
Polyethylene with natural density between 0.880 and 0.950 gm/cc.

Any of the following techniques may be used to provide a textured surface on the third layer, if desired:
Use of chemical blowing agents
Use of compressed gas blowing agents including nitrogen
Use of post extrusion texturing process such as lamination, spray-on, or embossing.

Figure 4:
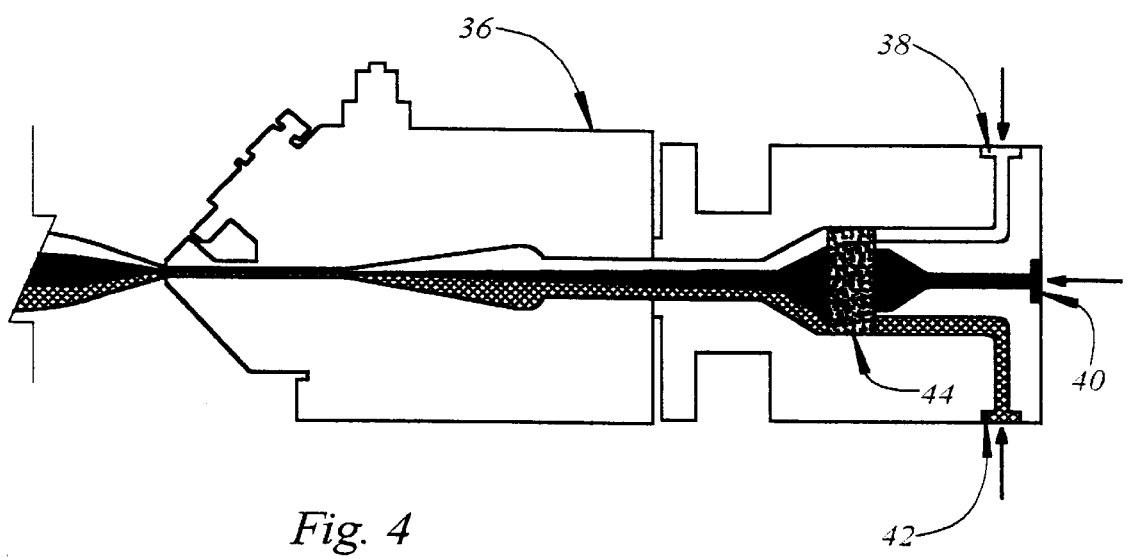
FIG. 4 is a sectional view illustrating a first embodiment of the method of the present invention.

FIG. 4 illustrates a first embodiment of the method of the present invention. A conventional co-extrusion die 36, of the type used to make cast co-extrusions, receives a molten thermoplastic adhesive which will eventually form the adhesive layer of the geomembrane 22 through an inlet 38. Molten thermoplastic material which eventually will form the barrier layer 32 of the geomembrane 22, is received through inlet 40. If the geomembrane 22 is to include a third layer, molten thermoplastic material which eventually will form the layer 34 of the geomembrane 22, is received through inlet 42. The materials received through the inlets of the die 36 are directed through a combining adapter 44 and are co-extruded to form the geomembrane 22 of the present invention.

Figure 5:
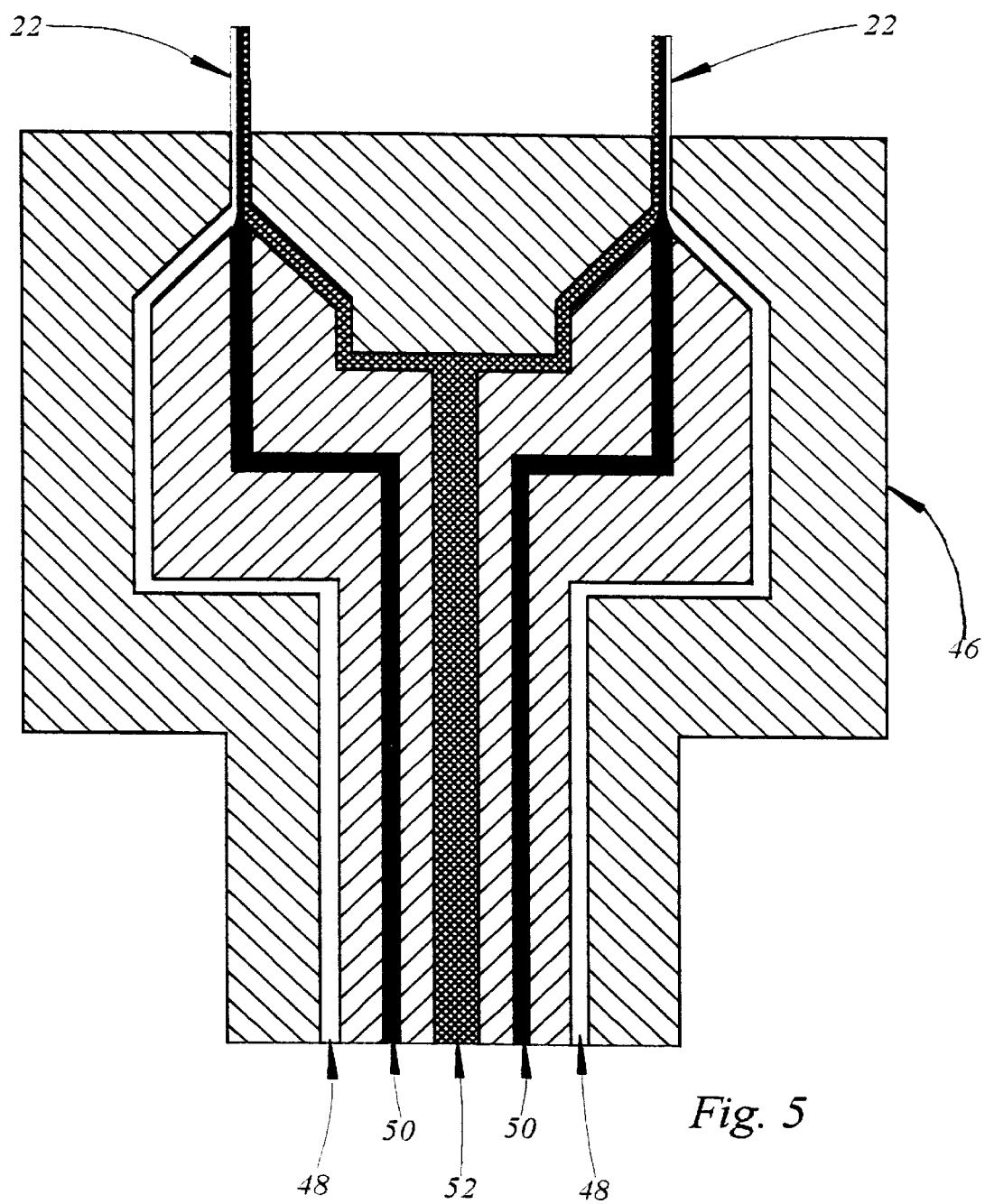
FIG. 5 is a sectional view illustrating a second embodiment of the method of the present invention.

FIG. 5 illustrates a second embodiment of the method of the present invention. A blown film co-extrusion die 46 receives molten thermoplastic adhesive material which eventually will comprise the adhesive layer 30 of the geomembrane 22 through a cylindrical inlet 48. Molten thermoplastic material, which eventually will form the barrier layer 32 of the geomembrane 22, is received through a cylindrical inlet 50. If the geomembrane is to include a third layer, molten thermoplastic material, which eventually will form the layer 34 of the geomembrane 22, is received through inlet 52. Within the die 46, the materials received through the inlets are co-extruded to form a blown film comprising the geomembrane 22 of the present invention.

Referring again to FIG. 2, the geomembrane of the present invention is hot as it leaves the die 36 or the die 46. Therefore, immediately following the manufacture thereof, the geomembrane 22 may be secured to the outer surface of the non-woven polypropylene textile layer 28 comprising the geosynthetic clay liner 20. The adhesive layer 30 of the geomembrane 22 adhesively secures the geomembrane 22 to the non-woven polypropylene material layer 28 thereby securely joining the geomembrane 22 of the present invention to the geosynthetic clay liner 20. The use of the adhesive layer 30 to secure the geomembrane 22 to the geosynthetic clay liner 20 assures complete bonding between the geomembrane 22 and the geosynthetic clay liner 20 thereby preventing separation during use.

Alternatively, the geomembrane 22 may be cooled following its manufacture. The geomembrane is then formed into rolls for transport to a separate assembly location. The geomembrane is unrolled and the adhesive layer thereof is heated to facilitate bonding of the geomembrane 22 to the geosynthetic clay liner 20.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A geomembrane for use in manufacturing liners for earthen constructions comprising:

a first quantity of thermoplastic material;

a quantity of thermoplastic adhesive material;

a second quantity of thermoplastic material having a blowing agent mixed therein;

the first quantity of thermoplastic material, the quantity of thermoplastic adhesive material, and the quantity of thermoplastic material comprising a co-extrusion forming a unitary construction comprising a barrier formed from the first quantity thermoplastic material, an adhesive layer formed from the thermoplastic adhesive material adhesively secured on one side to the barrier, and a layer formed from the second quantity of thermoplastic material adhesively secured to the opposite side of the adhesive layer.

2. The geomembrane according to claim 1 wherein the first quantity of thermoplastic material is selected from the group including:

high density polyethylene linear low density polyethylene low density polyethylene ultra low density polyethylene very low density polyethylene polypropylene copolymers of polypropylene, and terpolymers of polypropylene.

3. The geomembrane according to claim 1 wherein the quantity of a thermoplastic adhesive material is selected from the group including:

ethylene vinyl acetate (EVA)

ionomer ethylene methyl acrylate (EMA)

ethylene acrylic acid (EAA)

ethylene ethyl acrylate (EEA) and ethylene methyl acrylic acid (EMAA).

4. The geomembrane according to claim 1 wherein the second quantity of thermoplastic material is selected from the group including:

high density polyethylene linear low density polyethylene low density polyethylene ultra low density polyethylene very low density polyethylene polypropylene copolymers of polypropylene, and terpolymers of polypropylene.

5. The geomembrane according to claim 1 wherein the first quantity of thermoplastic material comprises high density polyethylene, wherein the quantity of thermoplastic adhesive material comprises a quantity of ethylene-vinyl acetate, and wherein the second quantity of thermoplastic material comprises a quantity of high density polyethylene having a blowing agent mixed therein.

* * * * *

UNITED STATES PATENT AND TRADEMARK OFFICE
CERTIFICATE OF CORRECTION

PATENT NO. : 6,524,029 B2
DATED : February 25, 2003
INVENTOR(S) : Nobert et al.

It is certified that error appears in the above-identified patent and that said Letters Patent is hereby corrected as shown below:

Column 2,
Line 51, replace "Acetate(EVA)" with -- Acetate (EVA) --.

Column 4,
Line 10, replace "and the quantity of" with -- and the second quantity of --.
Line 18, replace "of the adhesive layer" with -- of the first quantity thermoplastic material barrier layer --.

Signed and Sealed this

Twenty-fourth Day of June, 2003

JAMES E. ROGAN
*Director of the United States Patent and Trademark Office*